(No Model.)
L. ROTH.
COMPOSITION FOR SUPPOSITORIES.
No. 243,800. Patented July 5, 1881.
WITNESSES:
Carl Kay
Otto Risch
INVENTOR
Leonhard Roth,
BY Paul Goepel
ATTORNEY

UNITED STATES PATENT OFFICE.

LEONHARD ROTH, OF BROOKLYN, NEW YORK.

COMPOSITION FOR SUPPOSITORIES.

SPECIFICATION forming part of Letters Patent No. 243,800, dated July 5, 1881.

Application filed October 18, 1880. (No specimens.)

*To all whom it may concern:*

Be it known that I, LEONHARD ROTH, of Brooklyn, in the county of Kings and State of New York, have invented certain new and useful Improvements in Vaginal Suppositories, of which the following is a specification.

This invention relates to an improved composition for vaginal suppositories, by which certain female diseases of the uterus and vagina, such as leucorrhœa, (fluor albus,) &c., may be conveniently and effectively treated.

The invention consists of a composition for vaginal suppositories, which is prepared of tannic acid, alum, pulverized bearberry-leaves, opium, and glycerine.

The accompanying drawing represents a perspective view of my vaginal suppository, in which A represents the body of the suppository, and B a metallic cap-like cover or handle at one end of the same.

The suppository is made of a composition consisting of eight grams of tannic acid, six grams of alum, 4 grams of pulverized bearberry-leaves, (*uvæ ursi folia*,) one-tenth of a gram of opium, to which ingredients as much glycerine is added as is necessary to form a thick paste. From this paste a suppository of proper length and thickness is formed in the shape of a short bougie, which is of soft consistency, and which is readily introduced into the vagina by means of the handle or cap B, which is removed when the suppository has been properly introduced into the vagina.

The composition exerts a softening, invigorating, and at the same time astringent influence upon the interior membrane of the vagina, and is thereby especially adapted for the treatment of local diseases of the vagina and uterus.

Having thus described my invention, I claim as new and desire to secure by Letters Patent—

A composition for vaginal suppositories, consisting of tannic acid, alum, pulverized bearberry-leaves, opium, and glycerine, substantially as set forth.

In testimony that I claim the foregoing as my invention I have signed my name, in presence of two witnesses, this 12th day of October, 1880.

LEONHARD ROTH.

Witnesses:
PAUL GOEPEL,
CARL KARP.